June 17, 1952 R. HAFNER 2,600,531
ROTARY WING AIRCRAFT
Filed July 30, 1946 3 Sheets-Sheet 2
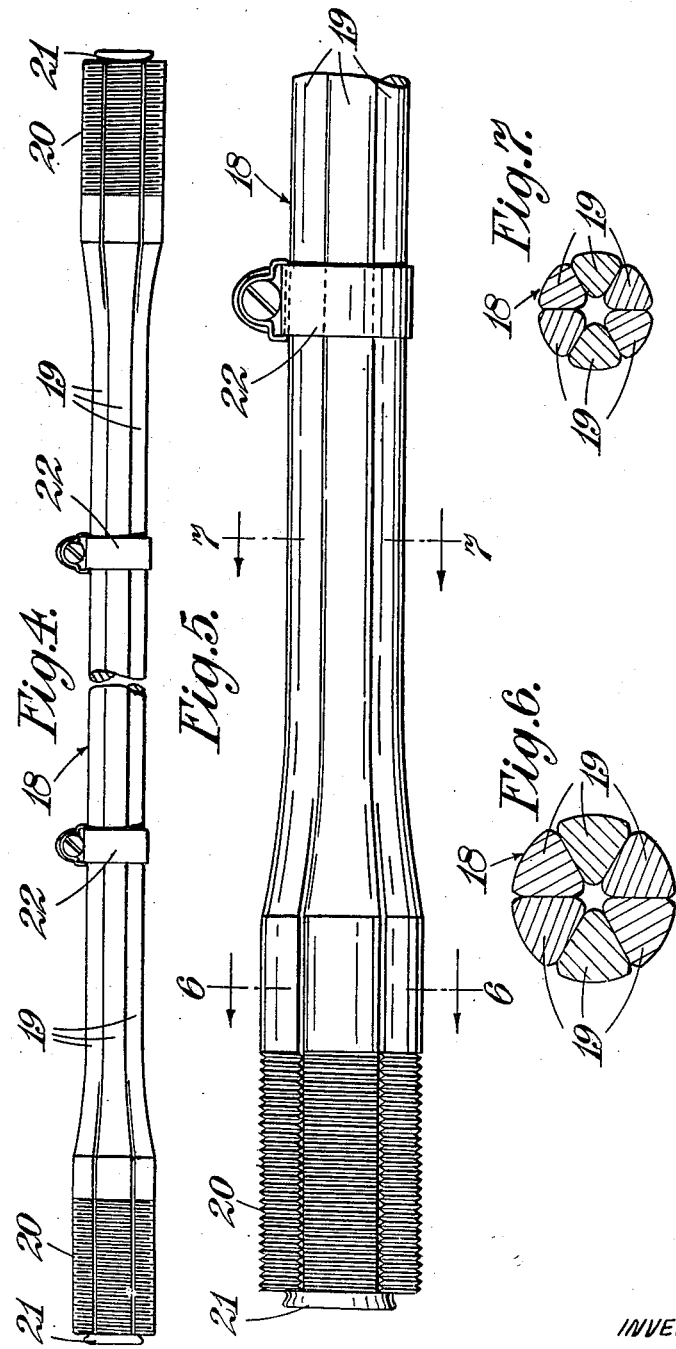
INVENTOR
RAOUL HAFNER
By Wilkinson & Mawhinney
ATTYS.

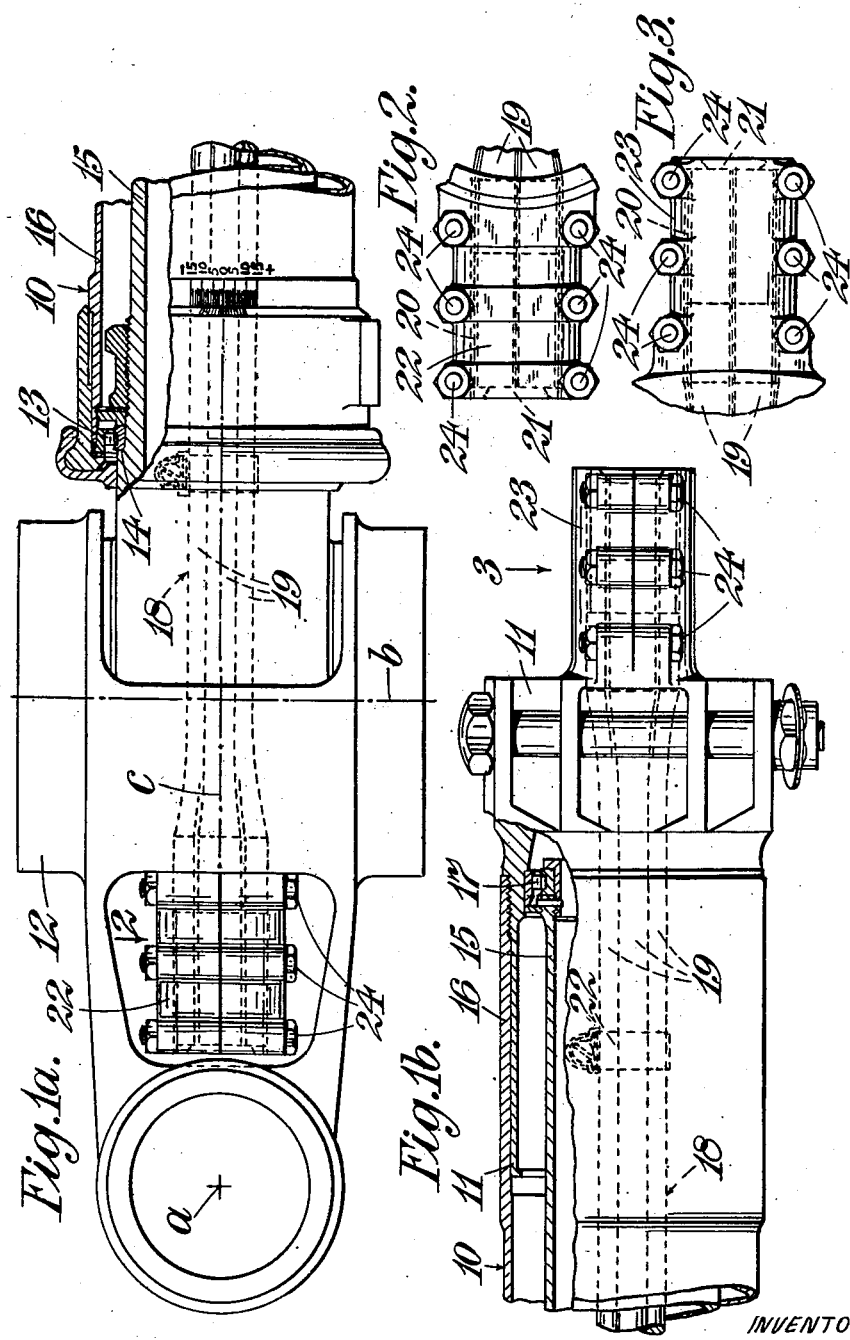

June 17, 1952     R. HAFNER     2,600,531
ROTARY WING AIRCRAFT
Filed July 30, 1946     3 Sheets-Sheet 3
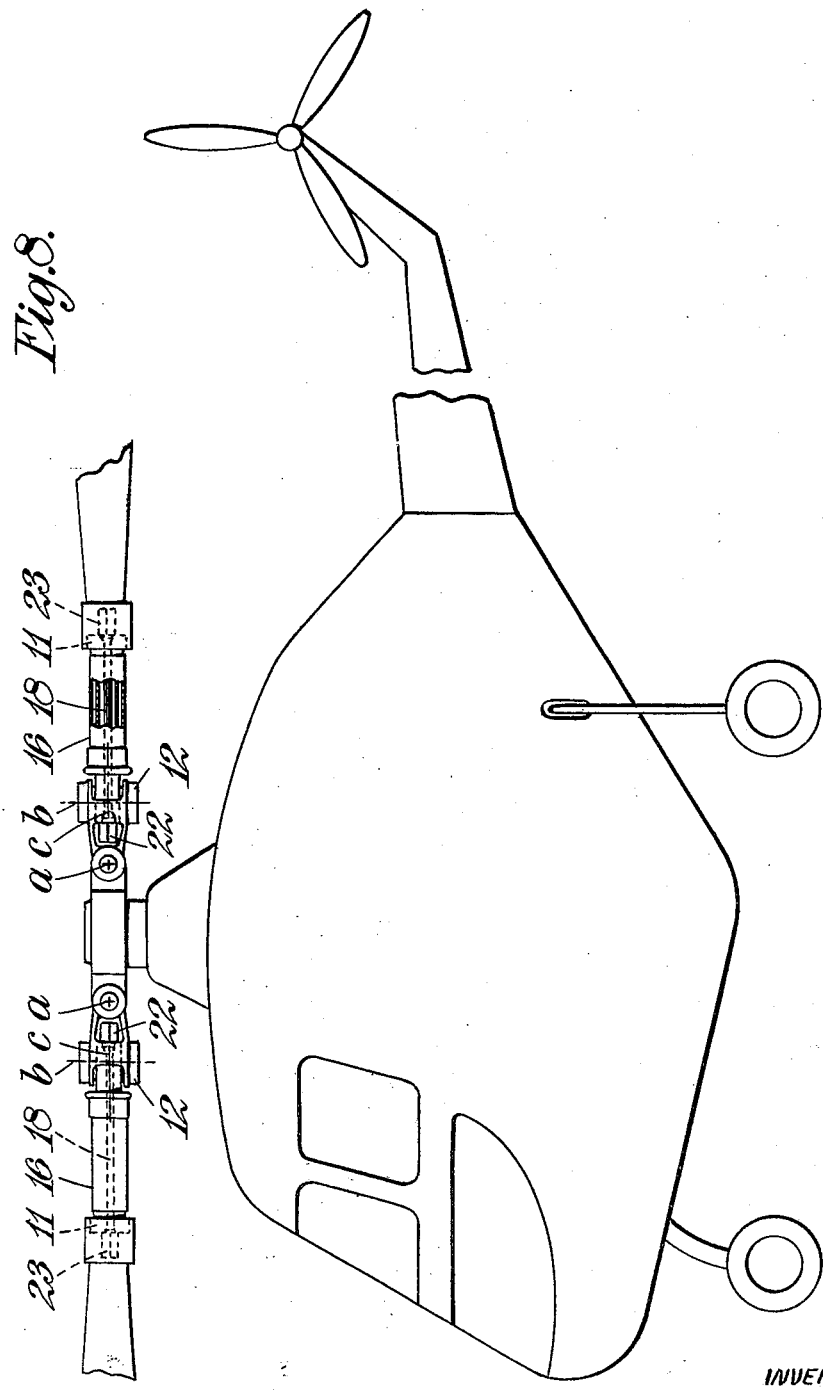
INVENTOR
RAOUL HAFNER
By Wilkinson & Mawhinney
ATTYS.

Patented June 17, 1952

2,600,531

UNITED STATES PATENT OFFICE 2,600,531

ROTARY WING AIRCRAFT

Raoul Hafner, Bristol, England, assignor to The Bristol Aeroplane Company Limited, Bristol, England, a British company Application July 30, 1946, Serial No. 687,129
In Great Britain August 17, 1945

5 Claims. (Cl. 170—160.53)

This invention concerns rotors for rotary wing aircraft of the kind in which the pitch of the rotor blades is adjustable cyclically or otherwise during the rotation of the rotor.

In rotors of the kind referred to it is desirable that the pitch adjustments be readily performed and accurately controlled. Two factors may adversely affect the ease and accuracy with which the pitch adjustments of the rotor-blades are performed. On the one hand, the centrifugal force to which each rotor blade is subjected during rotation of the rotor may attain a high value in which case if the force be transmitted from the blade to the rotor hub through the bearings upon which the blade is turned to vary the pitch, the loading on the bearings is such that the pitch adjustments of the blade cannot be performed in the manner indicated. Accordingly it has heretofore been proposed to relieve the bearings of the centrifugal force by connecting each blade to the rotor hub by a tie rod or stranded cable which transmits the centrifugal force from the blade to the rotor hub. These, however, are disadvantageous in that with a tie rod the tensile strength and torsional rigidity are so inter-related that selection of appropriate values for each is not possible, and in the case of a cable the tensile loading introduces undesirable torsional stress or movement. On the other hand, the cyclic pitch-adjustments of the rotor-blades result in the creation of forces due to the mass moment of inertia of each blade about its pitch-change axis and such forces may be transmitted from the blade to the control by which the pilot adjusts the blade-pitch—this is clearly undesirable.

The present invention has for its object to provide an improved construction of tie rod for rotors of the kind referred to.

According to the present invention a tie-rod for a rotor of the kind set forth comprises a plurality of individual members each of which is attached at one end to the rotor hub and at the other end to the rotor blade.

A tie-rod in accordance with the present invention permits either appropriate values to be selected for the tensile strength and torsional rigidity of the rod, or the selection of a torsional rigidity such that there is created (during cyclic pitch-change of the blades) forces which are adapted partly, or completely, to counteract the forces due to the mass moment of each blade about its pitch-change axis.

Preferably each tie-rod member is wedge-shaped in cross-section and the members are assembled with the tapering sides of adjacent tie-rod members in contact throughout the length of the tie-rod.

The face of the tie-rod members which forms a part of the periphery of the tie-rod is constituted at each end of the tie-rod member as part of a threaded element and the tie-rod members are relatively located on assembly to form the tie-rod so that said threaded element is completed whereby all the tie-rod members are capable of being simultaneously threaded as a unit into a member of the rotor hub and a part of the rotor blade.

If desired a rubber sheath or cover may be provided which extends over the length of the tie-rod between the pair of threaded elements or clips may encircle the rod.

A practical application of the present invention will now be described, by way of example, as applied to the rotor of a helicopter, the description being made with reference to the accompanying drawings whereof, Figures 1a and 1b together form a side elevation partly in section, of a member by which the rotor blade is attached to the rotor hub of the helicopter, Figures 2 and 3 are respectively views in the direction of arrows 2 and 3 of Figure 1, Figure 4 is a side view showing the complete tie-rod in accordance with the present invention, Figure 5 is a side view of a part of the tie-rod shown in Figure 4 and to an enlarged scale, Figures 6 and 7 are respectively sections on the line 6—6 and 7—7 of Figure 5, and Figure 8 is a side elevational view of a helicopter showing the improved device applied thereto and with parts broken away and parts in section.

Each blade of the helicopter rotor is supported in usual manner from the rotor hub (not shown) so as to be capable of rotation about a substantially vertical axis, that is in a generally horizontal plane. Each rotor blade is capable of vertical movements (usually referred to as flapping movements) and of movements about an axis generally parallel with the axis of rotation of the rotor as a whole. The latter movements are normally referred to as drag movements. In Figure 1a the flapping movements for the blade associated with the root attachment shown in this figure are performed about the axis $a$ and the drag movements about the axis $b$. The blade is also capable of movement about axis $c$ so as to vary the pitch of the blade. This action may be performed at the discretion of the pilot so as simultaneously to vary the pitch of all the blades of the rotor or it may be automatically and cyclically performed during the rotation of the rotor in any known manner.

To permit the movements of the blade about axis c the motor hub is provided with a radially extending arm generally indicated by the reference numeral 10 (one for each blade), the inner end of each blade (not shown) being secured to the part 11 (Figure 1b) of the arm 10. The arm 10 constitutes the root attachment by which the blade is secured to the rotor hub, the radial arm being pivotally carried by a member 12 so that it is capable of drag movements about the axis b, the member 12 being itself supported by the rotor hub so that it is capable of flapping movements about axis a.

The inner extremity of the radial arm 10 carries a ball bearing 13, the inner race 14 of which is secured to a tubular member 15 which is carried by the member 12 as described above. The outer race of the ball bearing 13 supports a sleeve 16 which is disposed concentric with the member 15. A similar arrangement is provided for the outer extremity of the radial arm 10, a ball bearing 17 (Figure 1b) being carried by the tubular member 15 and serving to support the sleeve 16 through the agency of the part 11. It will be observed from Figure 1b that the part 11 is permanently connected with the sleeve 16 and that the latter is mounted on the bearings 13, 17 for rotation about the axis c. Since the blade is carried or attached to the part 11 it follows that pitch adjustments of the blade will result in rotation of the sleeve 16 in the manner indicated.

As previously stated, it is desirable in order that the pitch adjustments of the blade be readily and accurately controlled that the centrifugal loads to which the blade is subjected be not transmitted from the sleeve 16 to the tubular member 15 through the bearings 13, 17 and accordingly a tie-rod 18 is attached at one end to the part 11 and at the other end to the tubular member 15. In this way the centrifugal force of the blade is entirely transmitted to the member 12 and hence to the rotor hub through the rod 18.

It has been found when the centrifugal load of a rotor blade attains a certain value, that a tie-rod of solid construction when possessed of the required tensile strength has too great a torsional rigidity; it is necessary, however, that the tie-rod be of considerable torsional flexibility if the pitch changes of the blade are to be performed satisfactorily.

The present invention provides that the tie-rod 18 comprises a plurality of independent members 19 each of which extends from one end to the other of the tie-rod. In cross-section the tie-rod 18 is substantially circular as is shown in Figures 6 and 7 and each member 19 is wedge-shaped. The tapering faces of adjacent members 19 of the tie rod 18 are in contact throughout their length.

The ends of each member 19 are upset to increase the cross-sectional dimensions thereof whilst retaining its wedge shape. Figure 6 shows the members 19 upset in the manner indicated in comparison with the members 19 of Figure 7. It will be appreciated that by this upsetting operation the diameter of the tie-rod 18 is increased at each end (see Figures 4 and 5). The face of the upset portion of members 19 which forms a part of the periphery of the tie-rod 18 is constituted as part of a threaded element so that on assembly of all the members 18 to form a tie-rod, each end of the latter is provided with a screw-threaded portion 20.

The extremity of each member 19 is formed with a segment of a circular flange having a curved periphery, the flange being completed when the members 19 are assembled. A cap 21 is provided to engage the flange and maintain the members 19 in their assembled position. Furthermore at spaced points along the length of the tie-rod 18 there is provided a pair of clips 22 to grip the members 19 and hold them together.

In assembling the tie-rod 18 in the rotor one end thereof is screwthreaded into a split bush 22 which is formed integral with the tubular member 15 whilst the other end of the rod is screwthreaded into a split bush 23 formed integral with the part 11. The split bushes 22 and 23 are each provided with a plurality of clamping screws 24 so that when the tie-rod 18 is screwed into position as described it may be clamped within the split bush thereby preventing rotation of the rod relatively to its attachments during pitch changes of the blade.

It will be appreciated that the member 12 carries a pin which is capable of rotation about axis b relatively to the member, the pin constituting the drag pin about which drag movements of the blade are performed. The tie rod 18 passes through the pin and engages the inboard side thereof so that the inboard end of the rod is solely supported by the pin and is free from the member 12. It will also be noted from Figure 1a that the inboard end of the rod 18 is spaced by a small amount from the bearing assembly about which the blade flaps, i. e. the bearing assembly having the axis a. Accordingly, when the blade is moved about the axes a and b the inboard end of the rod does not engage with the member 12 and complete freedom to perform said movements is permitted with the arrangement described. Of course, it will be appreciated that, if the drag movements become excessive, the inboard end of the rod may engage the member 12, but that this occurs only when the rotor blades are operating in an abnormal manner.

Preferably stops are associated with the inner extremity of the sleeve 16 the stops co-operating with corresponding stops formed on the tubular member 15. The arrangement is that under normal operating conditions of the rotor the pairs of stops are not in contact but that in the event of failure or overstrain of the tie-rod 18 the stops of sleeve 16 will be brought into engagement with the stops of member 15 and as a consequence the centrifugal force of the blades will be transmitted directly to the rotor hub through the sleeve 16. Such an arrangement of stops is known in connection with rotors for rotary wing aircraft.

I claim:

1. A helicopter rotor comprising a rotary driven power hub having a screw threaded portion, a variable pitch rotor blade having a screw threaded portion, a tie-rod comprising a plurality of individual members, the ends of each of which form part of cylindrical surfaces which are completed on assembly of the members to form the tie-rod, said cylindrical surfaces being provided with screw threads received by the screw threaded portions of the hub and blade; whereby the individual members are attached as a unit to the hub and blade.

2. A helicopter rotor as claimed in claim 1 characterized by the fact that the rod members are wedge-shaped in cross-section and that the tapering sides of adjacent members are in contact throughout their length.

3. A helicopter rotor as claimed in claim 2 characterized by the fact that the ends of each tie-rod member are upset so that the end portions of the assembled tie-rod are of greater diameter than the intermediate portions of the tie rod members.

4. A helicopter rotor as claimed in claim 3 characterized by the fact that clips hold the tie-rod members together to provide a unit assembly.

5. A helicopter rotor as claimed in claim 4 characterized by the fact that each end of each tie-rod member is provided with a segment of a circular flange having a curved periphery, said flanges being completed when said segments are assembled, and that a cap is provided and engages the completed flange at each end of the tie-rod to maintain the tie-rod members in their assembled position.

RAOUL HAFNER.

REFERENCES CITED

The following references are of record in the file of this patent:

UNITED STATES PATENTS

| Number | Name | Date |
| --- | --- | --- |
| 14,210 | Tufts | Feb. 5, 1856 |
| 1,135,516 | Frauenheim | Apr. 13, 1915 |
| 1,943,210 | De Lavaud | Jan. 9, 1930 |
| 1,970,114 | Weigand | Aug. 14, 1934 |
| 2,265,366 | Hafner | Dec. 9, 1941 |
| 2,365,357 | Prewitt | Dec. 19, 1944 |

FOREIGN PATENTS

| Number | Country | Date |
| --- | --- | --- |
| 385,074 | Great Britain | Dec. 22, 1932 |
| 332,451 | Italy | Nov. 29, 1935 |